United States Patent [19]

Otaka et al.

[11] Patent Number: 6,044,198

[45] Date of Patent: Mar. 28, 2000

[54] DIGITAL SIGNAL RECORDING/REPRODUCING DEVICE WITH EDITOR

[75] Inventors: Hideki Otaka, Neyagawa; Shinya Tanaka, Moriguchi; Takayasu Yoshida, Osaka, all of Japan

[73] Assignee: Matsushita Electric Industrial Co., Ltd., Osaka, Japan

[21] Appl. No.: 08/860,545

[22] PCT Filed: Oct. 24, 1996

[86] PCT No.: PCT/JP96/03094

§ 371 Date: Jun. 20, 1997

§ 102(e) Date: Jun. 20, 1997

[87] PCT Pub. No.: WO97/16019

PCT Pub. Date: May 1, 1997

[30] Foreign Application Priority Data

Oct. 27, 1995 [JP] Japan .................................. 7-280375

[51] Int. Cl.[7] .................................................. H04N 5/928
[52] U.S. Cl. ........................... 386/98; 386/46; 386/52; 348/705; 358/906
[58] Field of Search .................................... 386/3, 18, 34, 386/46, 49, 89, 52, 98, 109; 360/61–62; 358/906, 909.1; 348/705; H04N 5/928

[56] References Cited

U.S. PATENT DOCUMENTS

| | | | |
|---|---|---|---|
| 5,053,890 | 10/1991 | Mamiki .................................. 360/19.1 |
| 5,173,779 | 12/1992 | Lee ..................................... 358/213.26 |
| 5,200,834 | 4/1993 | Iwaibana et al. ........................ 358/324 |
| 5,497,193 | 3/1996 | Mitsuhashi et al. ..................... 348/231 |
| 5,502,487 | 3/1996 | Choi ........................................ 348/239 |
| 5,539,585 | 7/1996 | Sakai et al. .............................. 360/14.2 |
| 5,572,254 | 11/1996 | Kawahara ................................. 386/38 |
| 5,617,138 | 4/1997 | Ito et al. ................................ 348/222 |
| 5,689,611 | 11/1997 | Ohta et al. ................................ 386/46 |

FOREIGN PATENT DOCUMENTS 1-227286 9/1989 Japan .
6-350965 12/1994 Japan .

*Primary Examiner*—Wendy Garber
*Assistant Examiner*—Vincent F. Boccio
*Attorney, Agent, or Firm*—Wenderoth, Lind & Ponack, L.L.P.

[57] ABSTRACT

Disclosed is a digital signal recording and reproducing device for recording and reproducing a digital video signal. High efficiency encoding means encodes a digital video signal at a high efficiency, and recording means executes a predetermined encoding process for recording on the video data encoded at a high efficiency and records the video data obtained after the encoding process on a recording medium. On the other hand, reproducing means reproduces the video data recorded on the recording medium, executes a predetermined reproduced data processing for reproduction on reproduced video data and then outputs the video data obtained after the reproduced data processing. Delay means delays the video data outputted from the high efficiency encoding means by a delay time of a total of a delay time of the video data relevant to the processing of the recording means and a delay time of the video data relevant to the processing of the reproducing means, and outputs delayed video data, and selecting means selectively switches over between the video data outputted from the delay means and the video data outputted from the reproducing means, and outputs selected one of the two video data.

11 Claims, 7 Drawing Sheets

First Preferred Embodiment

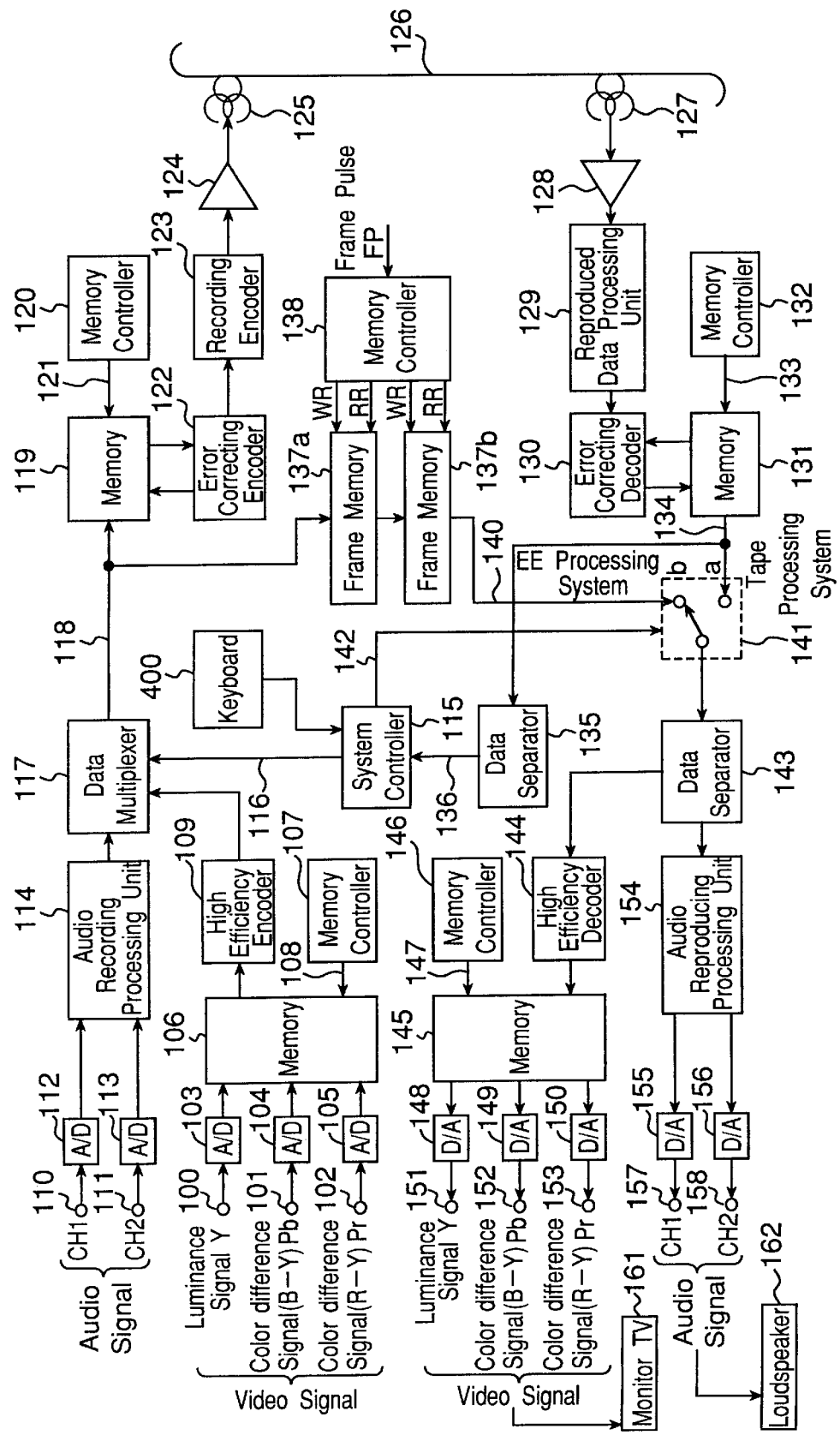
Fig. 1 First Preferred Embodiment

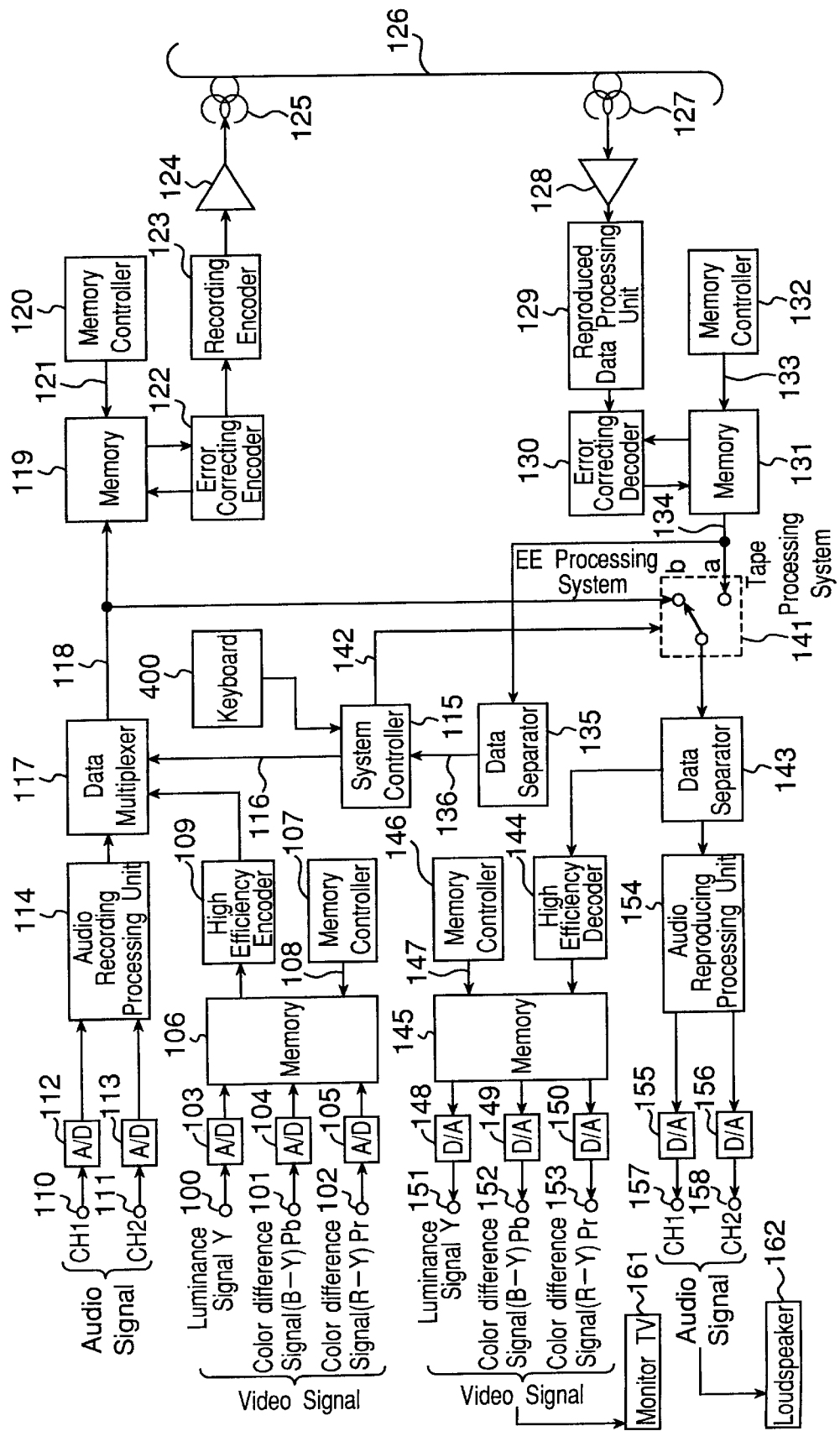
Fig. 2 Second Preferred Embodiment

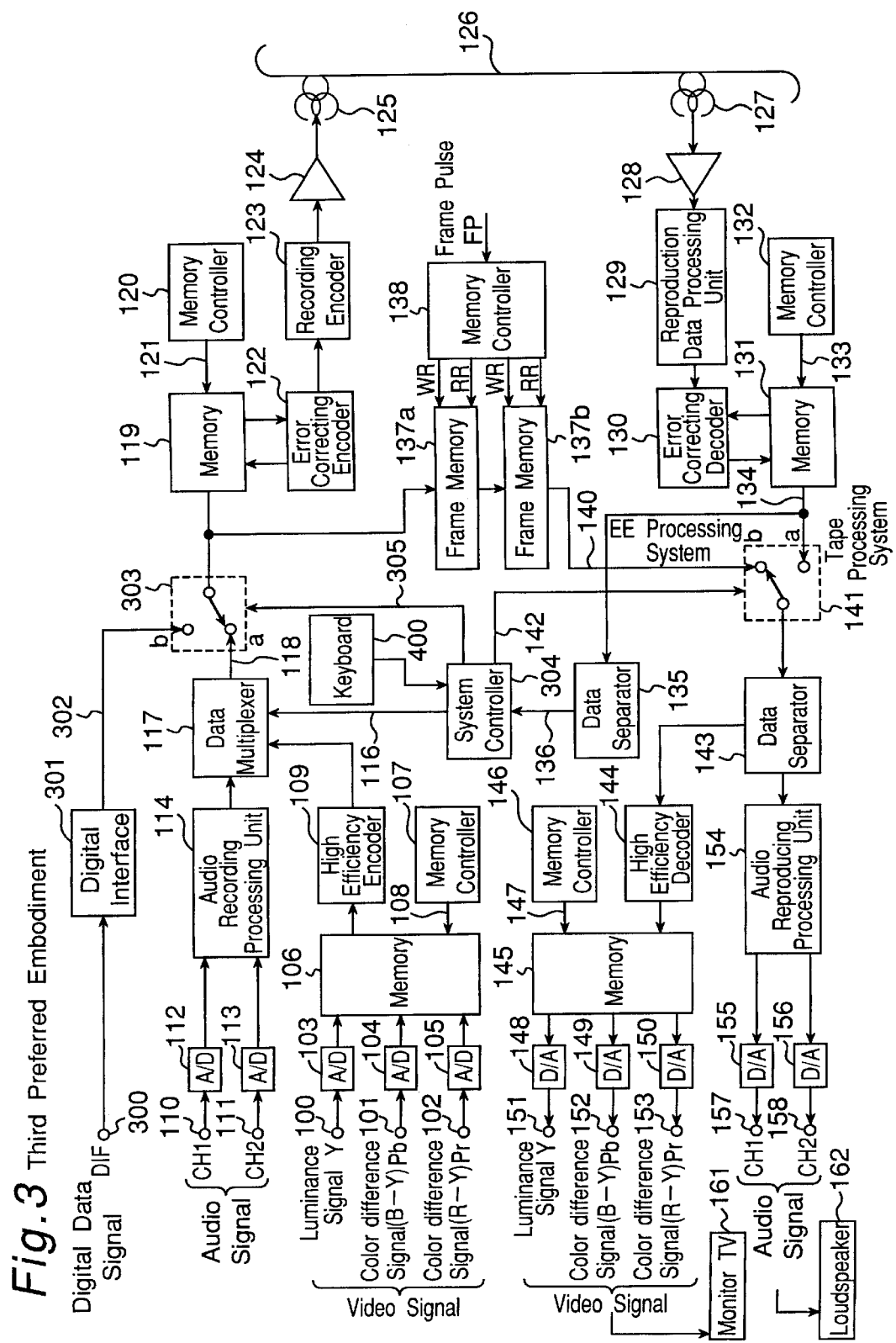
Fig. 3 Third Preferred Embodiment

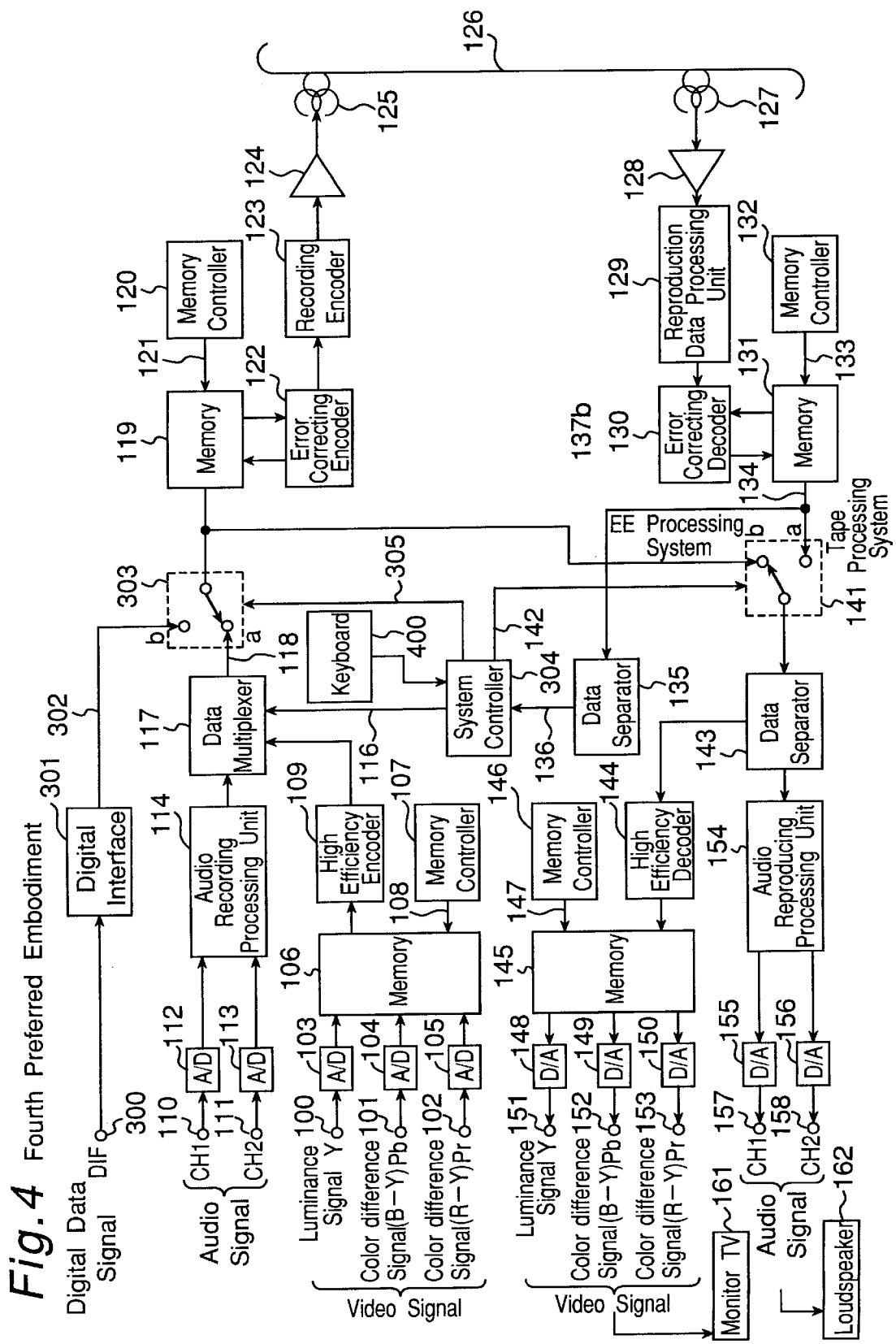

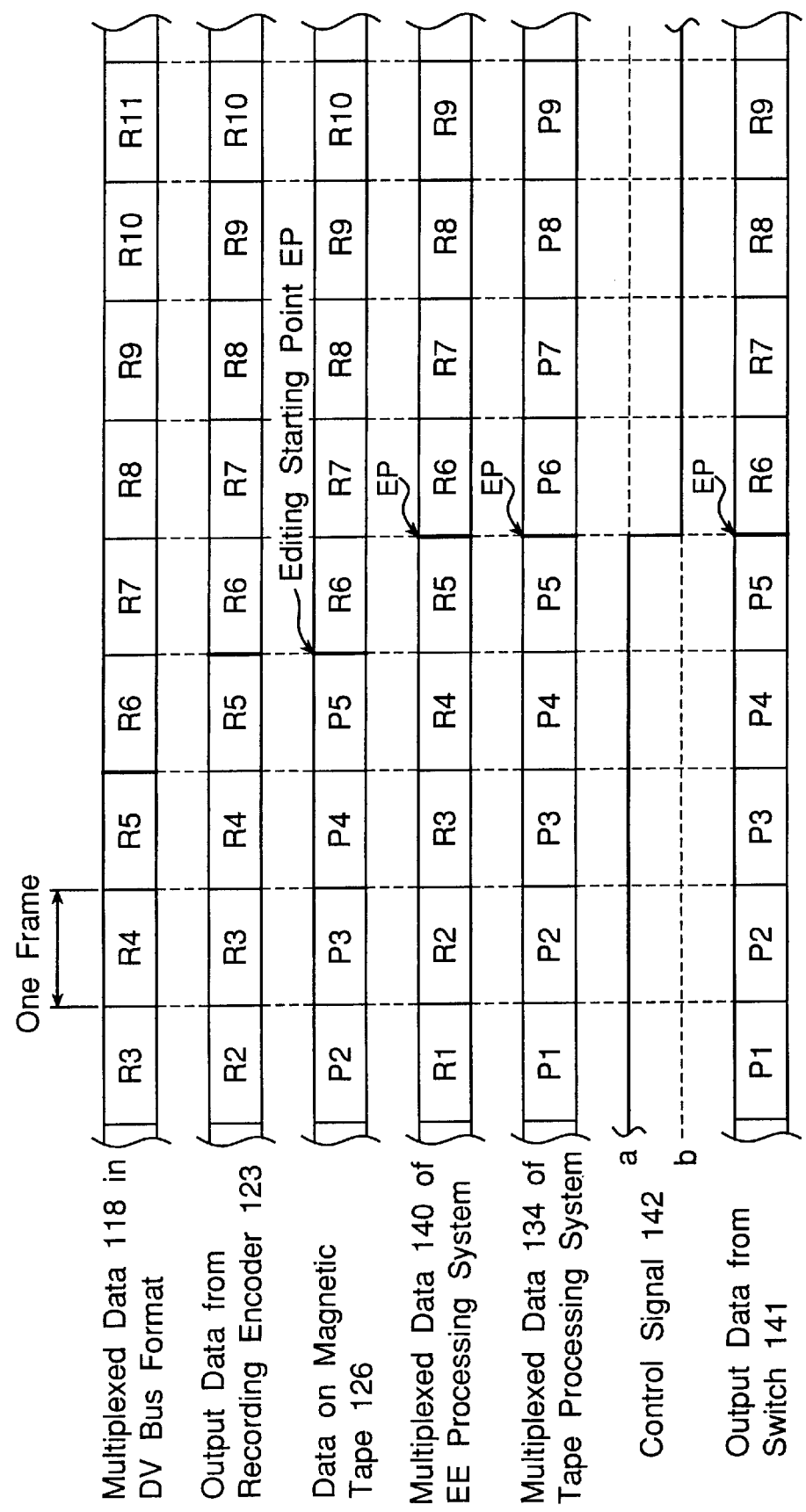

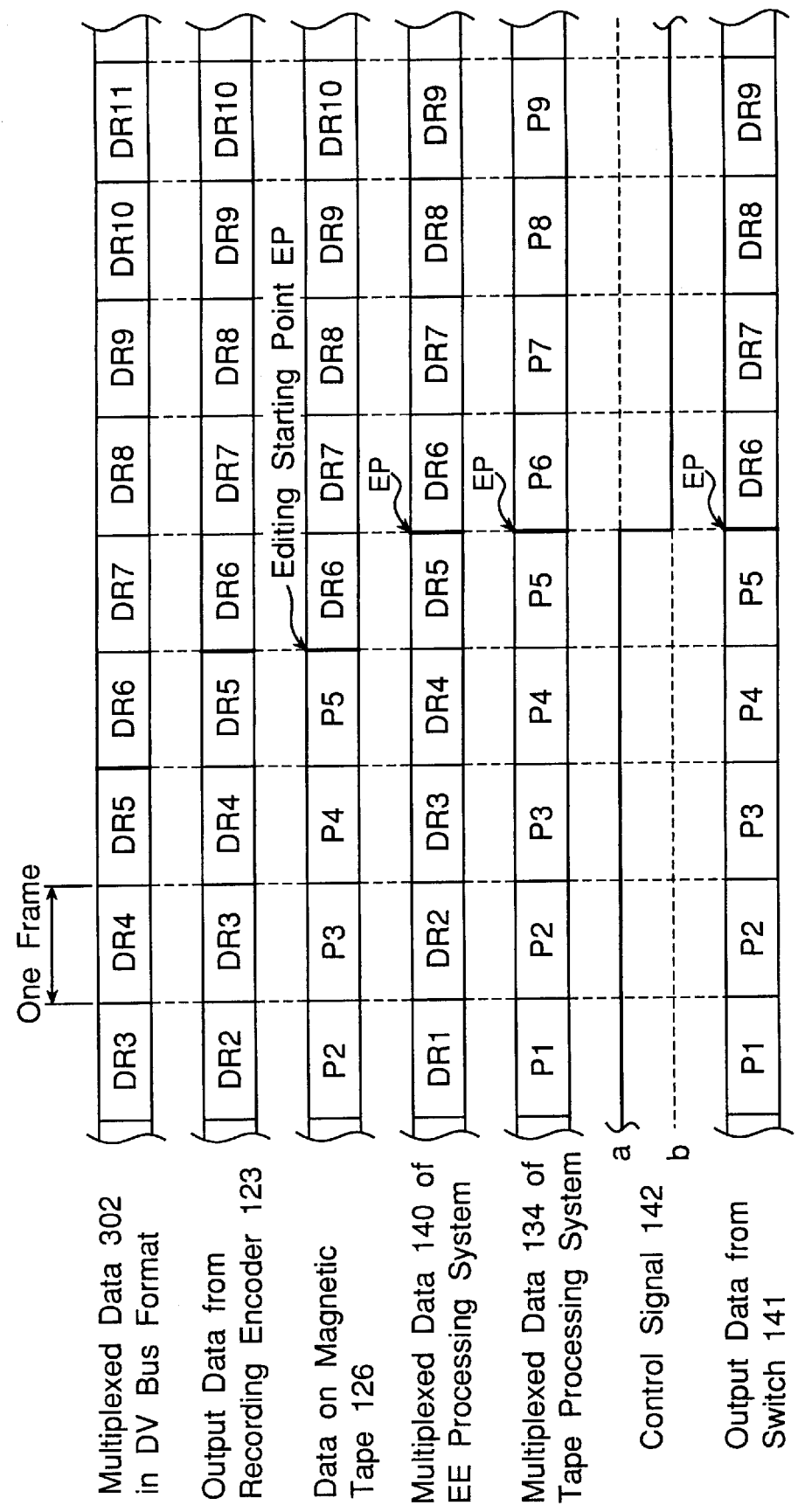
Fig. 6  Third Preferred Embodiment

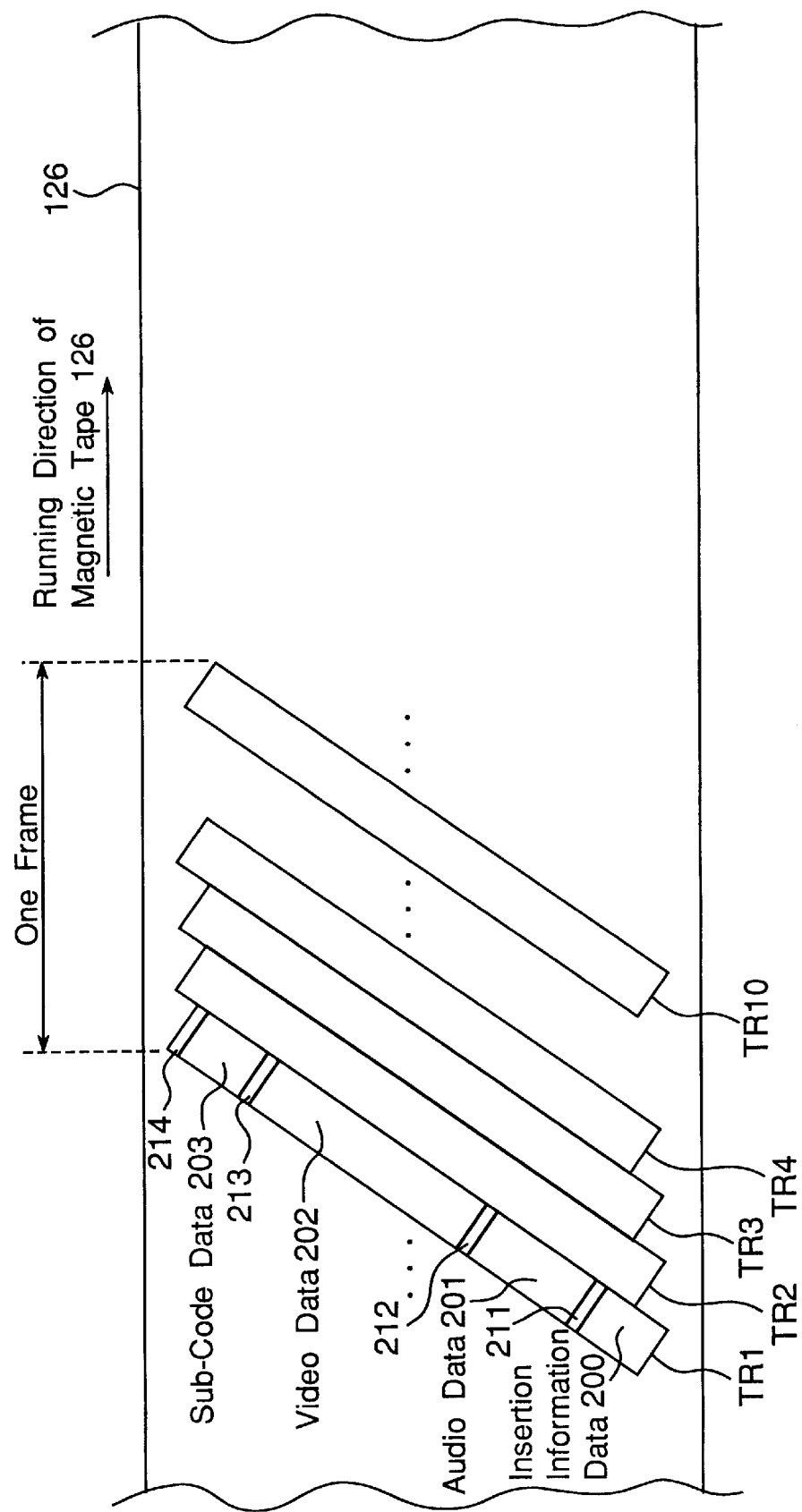

DIGITAL SIGNAL RECORDING/REPRODUCING DEVICE WITH EDITOR

BACKGROUND OF THE INVENTION

1. Field of Invention

The present invention relates to a digital signal recording and reproducing device provided with an editor, and in particular, to a digital signal recording and reproducing device such as a digital video tape recorder which is provided with an editor for editing a digital video signal and is used for recording and reproducing a digital video signal coded at a high efficiency.

2. Description of the Related Art

In recent years, with the trend of improving the image quality and promoting digitization of video equipment, there have been put into practice recording and reproducing devices which utilize digital recording instead of the conventional analog recording. As a representative apparatus, a digital recording video tape recorder (referred to as a digital VTR hereinafter) has been put into practice. The digital VTR has such a feature that the digital VTR has a high image quality as compared with the conventional analog VTR and is substantially free from deterioration due to dubbing. However, the digital VTR has such a disadvantage that the amount of data to be recorded significantly increases when a digitized video signal is recorded as it is. Therefore, in order to enable a long-time recording using a compact cassette tape, it is required to introduce a high efficiency coding technique for reducing the amount of data of the video signal. As a digital VTR signal format using the high efficiency coding, for example, a digital VTR format having the specifications of Consumer-Use Digital VCRs using a 6.3 mm magnetic tape (referred to as a DV format hereinafter) has been proposed by HD Digital VCR Conference (High Definition Digital Video Cassette Recorder Conference). According to the format, a 4:2:2 component signal, which conforms to the component signal digital coding standard of the current television system provided in ITU-R BT. 601 of ITU Recommendation, is compressed to about 1/6.7 thereof by the high efficiency coding, thereby allowing a long-time recording to be achieved with a ¼-inch width compact cassette tape.

When considering the replacement of the conventional analog VTR (referred to as an analog VTR hereinafter) with a digital VTR, the digital VTR is required to have functions equivalent to those of the analog VTR. In general, an editor for the recording and reproducing device such as a VTR or the like has two processing systems of:

a tape processing system for recording a video signal on a recording medium such as a magnetic tape or the like, thereafter processing data reproduced from the recording medium to convert the same reproduced data into a video signal, and outputting the video signal (referred to as a tape processing system hereinafter); and an electric-to-electric processing system for outputting an inputted video signal as a video signal as it is (referred to as an EE processing system hereinafter). These two systems can be selectively switched according to a VTR mode.

During reproduction, the tape processing system is normally selected, and the data reproduced from the magnetic tape is processed to be converted into a video signal, and then, the video signal is outputted to a monitor television set. During recording, the EE processing system is selected since the user is required to simultaneously monitor the video signal of the data that is being recorded on the magnetic tape by means of the monitor television set. Further, in an insertion editing stage in which a further video image or sound is inserted in a magnetic tape that has been already recorded, these two modes are used in combination. That is, the EE processing system is selected for the interval for which the insertion recording is performed, and the tape processing system is selected for the other interval since it is required to output the video signal of the data that has been already recorded on the magnetic tape to the monitor television set. A method for implementing the EE processing system and the tape processing system will be described in detail below.

The prior art digital VTR provided with an editor is generally constructed as follows. An inputted video signal is converted into a digital signal by an analog-to-digital converter (referred to as an A/D converter hereinafter), and thereafter, the digital signal is compressed into video data having a predetermined amount of data by a high efficiency encoder. The compressed video data is processed by error correcting encoding, adding a parity for use in an error correcting process, and then, it is subjected to a modulation process for the recording thereof onto a magnetic tape, and the processed video data is recorded on the magnetic tape. When reproducing the video data recorded on the magnetic tape, the reproduced video data is inputted to a high efficiency encoder via a demodulation process and an error correcting decoding process. In the high efficiency encoder, the compressed video data is decompressed into the original video data, and thereafter, it is converted into an analog video signal by a digital-to-analog converter (referred to as a D/A converter hereinafter), then the analog signal is outputted.

In the above-mentioned prior art digital VTR, the processing system for processing the video data reproduced from the magnetic tape is the tape processing system. Further, in order to implement the EE processing system, it is required to output the video signal inputted to the digital VTR by putting the same video signal through a reproduction processing system for the magnetic tape in the middle of the processing. Therefore, the EE processing system is implemented by inputting the digital video data that has been converted by the A/D converter to the D/A converter after delaying the digital video data by a predetermined number of frames by means of a storage device. In the EE processing system, the video data is delayed using the storage device after the analog-to-digital conversion by the A/D converter. This is provided for the purpose of achieving a time coincidence between the video data to be recorded on the magnetic tape and the video data to be outputted to the monitor television set in the editing stage.

However, in the above-mentioned prior art digital VTR, there has been such a problem that the memory capacity of the storage device required for delaying the video data of the EE processing system for a timing matching of the video data of the EE processing system to the video data of the tape processing system (referred to as a timing matching hereinafter) becomes very large.

For example, in order to delay the 4:2:2 component signal by one frame, a memory of about 5.5 Mbits is required. Since a rearrangement process is executed in a unit of frame in the high efficiency encoding process and the high efficiency decoding process, and an intra-frame rearrangement process is executed in the error correcting encoding stage and the error correcting decoding stage when the above-mentioned DV format is used, then, a delay of a total of four frames occurs in the recording system and the reproduction system. Therefore, a storage device having a storage capacity of four frames=22 Mbits is required for the purpose of delaying the video data of the EE processing system obtained through the analog-to-digital conversion by the A/D converter.

For example, when the memory for the delaying of the EE processing system is removed for the purpose of reducing the circuit scale of the digital VTR, there occurs such a problem that the time correspondence relation between the output video signal to the monitor television set and the video data that is actually recorded on the magnetic tape is deviated in the editing stage. That is, the editing point confirmed on the monitor television set differs in time from the editing point on the magnetic tape in the editing process, and this may cause the user to erroneously perceive the editing point.

SUMMARY OF THE INVENTION

A first object of the present invention is to provide a digital signal recording and reproducing device capable of remarkably reducing the memory capacity of a storage device required for delaying the video data of the EE processing system, for the purpose of the above-mentioned timing matching, in a digital signal recording and reproducing device using the high efficiency coding as compared with the prior art.

A second object of the present invention is to provide a digital signal recording and reproducing device capable of reducing the time difference between the video data of the tape processing system and the video data of the EE processing system, in the above-mentioned editing stage, in a digital signal recording and reproducing device using the high efficiency coding as compared with the prior art.

According to a first aspect of the present invention, there is provided a digital signal recording and reproducing device comprising:

high efficiency encoding means (109) for encoding a digital video signal at a high efficiency and outputting video data encoded at the high efficiency;

recording means (123, 124, 125) for executing a predetermined encoding process for recording on the video data that is encoded at the high efficiency and outputted from the high efficiency encoding means (109) and for recording video data obtained after the encoding process on a recording medium (126);

reproducing means (127, 128, 129) for reproducing the video data recorded on the recording medium (126), executing a predetermined reproduced data processing for reproduction on reproduced video data and for outputting video data obtained after the reproduced data processing;

delay means (137a, 137b) for delaying the video data outputted from the high efficiency encoding means (109), by a delay time of a total of a delay time of the video data relevant to the processing of the recording means (123, 124, 125) and a delay time of the video data relevant to the processing of the reproducing means (127, 128, 129), and for outputting delayed video data;

selecting means (141) for selectively switching over between video data outputted from the delay means (137a, 137b) and video data outputted from the reproducing means (127, 128, 129), and for outputting selected one of the video data; and high efficiency decoding means (144) for high-efficiency-decoding the video data outputted from the selecting means (141), and for outputting video data high-efficiency-decoded.

Therefore, as compared with the prior art, the memory capacity of the storage device required for delaying the video data of the EE processing system for the purpose of the above-mentioned timing matching can be remarkably reduced.

Furthermore, according to a second aspect of the present invention, there is provided a digital signal recording and reproducing device comprising:

high efficiency encoding means (109) for encoding a digital video signal at a high efficiency, and for outputting video data encoded at the high efficiency;

recording means (123, 124, 125) for executing a predetermined encoding process for recording on the video data that is encoded at the high efficiency and outputted from the high efficiency encoding means (109) and for recording video data obtained after the encoding process on a recording medium (126);

reproducing means (127, 128, 129) for reproducing the video data recorded on the recording medium (126), executing a predetermined reproduced data processing for reproduction on reproduced video data, and for outputting video data obtained after the reproduced data processing;

selecting means (141) for selectively switching over between video data outputted from the high efficiency encoding means (109) and video data outputted from the reproducing means (127, 128, 129), and for outputting selected one of the video data; and high efficiency decoding means (144) for high-efficiency-decoding the video data outputted from the selecting means (141) and for outputting video data high-efficiency-decoded.

Therefore, as compared with the prior art, the time difference between the video data of the tape processing system and the video data of the EE processing system in the above-mentioned insertion editing stage can be reduced.

BRIEF DESCRIPTION OF THE DRAWINGS

FIG. 1 is a block diagram showing a construction of a digital VTR provided with an editor according to a first preferred embodiment of the present invention;

FIG. 2 is a block diagram showing a construction of a digital VTR provided with an editor according to a second preferred embodiment of the present invention;

FIG. 3 is a block diagram showing a construction of a digital VTR provided with an editor according to a third preferred embodiment of the present invention;

FIG. 4 is a block diagram showing a construction of a digital VTR provided with an editor according to a fourth preferred embodiment of the present invention;

FIG. 5 is a timing chart showing an operation of the digital VTR of the first preferred embodiment shown in FIG. 1;

FIG. 6 is a timing chart showing an operation of the digital VTR of the third preferred embodiment shown in FIG. 3; and FIG. 7 is a plan view showing a format of data recorded on a magnetic tape of the digital VTRs of the first to fourth preferred embodiments.

DETAILED DESCRIPTION OF THE PREFERRED EMBODIMENTS

Preferred embodiments of the present invention will be described below with reference to the accompanying drawings.

First Preferred Embodiment

FIG. 1 is a block diagram showing a construction of a digital VTR provided with an editor according to a first preferred embodiment of the present invention.

In FIG. 1 are shown an input terminal 100 for receiving an input of an analog luminance signal, an input terminal 101 for inputting a color difference signal (B–Y) and an input terminal 102 for inputting a color difference signal (R–Y). Further, an input terminal 110 is an input terminal for inputting an audio signal of Channel 1, and an input terminal 111 is an input terminal for inputting an audio signal of Channel 2. Further, an output terminal 151 is an output terminal for outputting the analog luminance signal, an output terminal 152 is an output terminal for outputting the color difference signal (B–Y), and an output terminal 153 is an output terminal for outputting the color difference signal (R–Y). Further, an output terminal 157 is an output terminal for outputting the audio signal of Channel 1, and an output terminal 158 is an output terminal for outputting the audio signal of Channel 2. In this case, the output terminals 151, 152 and 153 are connected to a monitor television set 161 which is an external apparatus, while the output terminals 157 and 158 are connected to a monitor loudspeaker 162 which is an external apparatus.

The digital VTR of the present preferred embodiment comprises:

(a) A/D converters 103, 104 and 105 which respectively subject the analog video signals, including the luminance signal, the color difference signal (B–Y) and the color difference signal (R–Y), to analog-to-digital conversion to convert the analog video signals into respective digital video data (or digital video signals);

(b) a memory 106 for rearranging video data for converting the video data, which is inputted in a unit of field after the analog-to-digital conversion, into video data in a unit of frame;

(c) a memory controller 107 for controlling the operation of the memory 106 using a control signal 108;

(d) a high efficiency encoder 109 which compresses the video data read out in a unit of frame from the memory 106 by a high efficiency coding method such as an intra-frame DCT (Discrete Cosine Transform) or the like and outputs the resulting data;

(e) A/D converters 112 and 113 each of which converts an analog audio signal into digital audio data (or a digital audio signal);

(f) an audio recording processing unit 114 which performs a process including an interleave in a unit of frame or the like on the A/D converted audio data to convert the A/D converted audio data into audio data in a unit of frame, and outputs resulting data;

(g) a keyboard 400 which is used for inputting instruction data for designating the frame of an editing starting point EP and the frame of an editing end point which are switching points of a switch 141 and outputting the instruction data to a system controller 115;

(h) the system controller 115 which controls the whole operation of the digital VTR so as to generate sub-code data 116 including time code data in response to the instruction data for designating the frame of the editing starting point EP and the frame of the editing end point to output the sub-code data 116 to a data multiplexer 117, and also outputs a control signal 142 for the switch 141, in response to sub-code data 136 outputted from the data separator 135 including the time code data for designating the frame of the editing starting point EP and the frame of the editing end point, so as to switch the switch 141 from its a-side to its b-side or switch the switch 141 from the b-side to the a-side;

(i) a data multiplexer 117 which time-division-multiplexes the compressed video data, interleaved audio data and sub-code data, and then outputs multiplexed data 118 to a memory 119 and a frame memory 137a via a digital video bus (referred to as a DV bus hereinafter);

(j) the memory 119 for performing a rearrangement on the multiplexed data 118 in a unit of frame and executing an error correcting encoding process;

(k) a memory controller 120 for controlling the operation of the memory 119 using a control signal 121;

(l) an error correcting encoder 122 which adds an error correcting parity to the multiplexed data 118 by means of the memory 119, and then outputs the multiplexed data in which the error correcting parity has been added;

(m) a recording encoder 123 which performs recording encoding on the multiplexed data outputted from the error correcting encoder 122 using, for example, a 24-to-25 conversion method and an interleaved NRZI coding method to modulate the multiplexed data and outputs the recording signal obtained after the modulation; and (n) a recording amplifier 124 which amplifies the recording signal, and then outputs the recording signal obtained after the amplification to a recording magnetic head 125 to record the recording signal on a magnetic tape 126.

Further, the digital VTR of the present preferred embodiment further comprises:

(o) a reproducing amplifier 128 which amplifies a recording signal reproduced by a reproducing magnetic head 127 (the signal being referred to as a reproduced signal hereinafter) and then outputs the amplified reproduced signal;

(p) a reproduced data processing unit 129 which performs equalizing, data detection and demodulation processings on the reproduced signal outputted from the reproducing amplifier 128, and then outputs the reproduced multiplexed data obtained after the processings;

(q) an error correcting decoder 130 which performs error correcting decoding process on the reproduced multiplexed data based on the error correcting parity by means of a memory 131, and then outputs the multiplexed data obtained after the error correcting decoding process;

(r) the memory 131 for executing the error correcting decoding process by performing rearrangement on the reproduced multiplexed data in a unit of frame;

(s) a memory controller 132 which controls the operation of the memory 131 using a control signal 133, and then outputs multiplexed data 134 of the tape processing system obtained after the processing to the a-side of the switch 141;

(t) frame memories 137a and 137b, which are connected in series with each other, and each of which delays by one frame the multiplexed data 118 outputted from the data multiplexer 117 via the DV bus, and which consequently outputs multiplexed data 140 of the EE processing system delayed by a total of two frames to the b-side of the switch 141;

(u) a memory controller 138 which generates a write reset pulse WR for controlling a write operation of the frame memory 137a and a read reset pulse RR for controlling a read operation of the frame memory 137a in response to a frame pulse FP that is a frame reference signal generated in synchronization with the video signals inputted via the input terminals 100, 101 and 102 in the digital VTR, then outputs the generated pulses WR and RR to the frame memory 137a so as to control the operation of the frame memory 137a, generates a write reset pulse WR for controlling a write operation of the frame memory 137b and a read reset pulse RR for controlling a read operation of the frame memory 137b, and then outputs the generated pulses WR and RR to the frame memory 137b so as to control the operation of the frame memory 137b;

(v) a data separator 135 which separates or demultiplexes the sub-code data 136 from the multiplexed data 134 of the tape processing system outputted from the memory 131, and then outputs the sub-code data 136 to the system controller 115;

(w) the switch 141 which selects either one of the multiplexed data 134 of the tape processing system and the multiplexed data 140 of the EE processing system and outputs the selected data;

(x) a data separator 143 which time-division-demultiplexes the compressed video data and audio data from the multiplexed data outputted from the switch 141, and then outputs these data to a high efficiency decoder 144 and an audio reproducing processing unit 154, respectively;

(y) a high efficiency decoder 144 which decompresses the compressed video data, and then outputs the decompressed video data to a memory 145;

(z) the memory 145 which rearranges to convert the video data in a unit of block, which has been high-efficiency-decoded and is outputted from the high efficiency decoder 144, into video data in a unit of field, and then outputs the resulting data;

(aa) a memory controller 146 which controls the operation of the memory 145 using a control signal 147;

(ab) D/A converters 148, 149 and 150 which subject the digital video data (or digital video signal) of the luminance signal, color difference signal (B–Y) and color difference signal (R–Y) outputted from the memory 145 to digital-to-analog conversion to convert these data into respective analog video signals;

(ac) an audio reproducing processing unit 154 which performs reproduction on the audio data that has been separated or demultiplexed by the data separator 143 and outputted therefrom to convert the audio data into audio signals of Channel 1 and Channel 2, and outputs the audio signals; and (ad) D/A converters 155 and 156 which convert the digital audio data (or digital audio signal) processed by the audio reproducing processing unit 154 into analog audio signals, respectively.

The construction and operation of the present preferred embodiment will be described in detail below with reference to FIG. 1.

Referring to FIG. 1, the luminance signal inputted via the input terminal 100 and the two color difference signals inputted via the input terminals 101 and 102 are subjected to analog-to-digital conversion by the A/D converters 103, 104 and 105 to be converted into digital video data, and the three pieces of digital video data obtained after the analog-to-digital conversion are inputted to the memory 106. In the memory 106, the inputted video data in a unit of field are multiplexed to form a frame, and the video data are read out in a unit of block for the high efficiency coding process from the memory 106 to the high efficiency encoder 109. The digital VTR of the present preferred embodiment adopts the intra-frame DCT (Discrete Cosine Transform) as the high efficiency coding method, and therefore, the video data are read out in a unit of DCT block comprised of eight pixels by eight lines from the memory 106. The high efficiency encoding is performed on the video data in a unit of DCT block read out from the memory 106 by the high efficiency encoder 109, and thereafter the video data obtained after the high efficiency encoding process is outputted to the data multiplexer 117.

The high efficiency encoding process is executed in a unit of five macro blocks, where one macro block is comprised of six DCT blocks consisting of four DCT blocks of the luminance signal and two DCT blocks of the color difference signal. Further, five macro blocks constituting one compression unit are collected from mutually separated positions on the screen for the purpose of improving the efficiency of the high efficiency encoding process. Therefore, when reading out the video data of macro blocks from the memory 106, macro blocks located in mutually separated positions on the screen are sequentially read out. As described above, the coding method for performing the shuffling on the video data before the high efficiency coding process and using five macro blocks of a unit of compression for the purpose of increasing the efficiency of the high efficiency coding process is disclosed in, for example, U.S. Pat. No. 5,175,631, and its contents are included for reference in the present specification. For the above-mentioned framing process and shuffling process, it is required to store the video data of one frame once in the memory 106, and therefore, this leads to a delay of about one frame.

On the other hand, the audio signals of two channels inputted from the input terminals 110 and 111 are respectively subjected to the analog-to-digital conversion by the A/D converters 112 and 113 to be converted into digital audio data (or digital audio signals), and thereafter the digital audio data obtained after the analog-to-digital conversion is inputted to the audio recording processing unit 114. Subsequently, the audio data obtained after the audio recording process is outputted to the data multiplexer 117. In order to effectively perform a concealment process when an uncorrectable error occurs in the stage of reproduction, an interleaving process is executed in a unit of frame individually for the audio data of the two channels in the audio recording processing unit 114. Since the audio data is smaller in data amount per frame than the video data, the interleaving process is executed by means of a built-in memory (not shown) provided in the audio recording processing unit 114.

Further, the keyboard 400 is provided for inputting the instruction data for designating the frame of the editing starting point EP and the frame of the editing end point that are switching points of the switch 141 and so forth and outputting the instruction data to the system controller 115. The system controller 115 controls the whole operation of the digital VTR to generate the sub-code data 116 including time code data in response to the instruction data for designating the frame of the editing starting point EP and the frame of the editing end point, to output the generated sub-code data 116 to the data multiplexer 117 and to output the control signal 142 of the switch 141 so as to switch the switch 141 from the a-side to the b-side or switch the switch 141 from the b-side to the a-side in response to the sub-code data 136 including the time code data for designating the frame of the editing starting point EP and the frame of the editing end point.

The data multiplexer 117 time-division-multiplexes the compressed video data outputted from the high efficiency encoder 109, the audio data outputted from the audio recording processing unit 114 and the sub-code data 116 to convert these data into the multiplexed data 118, and then outputs the multiplexed data to the memory 119 and the frame memory 137a via the DV bus. It is to be noted that various kinds of control signals are time-division-multiplexed in addition to the above-mentioned signals in regard to the multiplexed data 118 on the DV bus. However, these control signals have no relation to the present invention, and therefore, no description is provided therefor in the present preferred embodiment.

In the memory 119, first of all, the compressed video data are rearranged under the control of the memory controller 120. The rearrangement is a process for restoring the video data that has been rearranged for the high efficiency coding and put in the compressed state into the original data arrangement, and it is intended for improving the picture quality in a high-speed reproduction stage. Due to this rearrangement, this leads to a delay of one frame. Then, in the error correcting encoder 122, an outer parity and an inner parity are sequentially added to the video data that have been rearranged and put in the compressed state and the audio data. Further, only the inner parity is added to the sub-code data. The multiplexed data that has undergone the error correcting encoding process is inputted to the recording encoder 123. It is to be noted that the error correcting encoding process using a common inner parity is executed on the compressed video data and the audio data in the above-mentioned error correcting encoding process. With regard to the parity addition in the other encoding process, different systems are used.

Further, the recording encoder 123 performs recording encoding on the multiplexed data inputted from the error correcting encoder 122 to modulate the same multiplexed data using, for example, the 24-to-25 conversion method and the interleaved NRZI coding method so as to modulate the multiplexed data, and then outputs the recording signal obtained after the modulation to the recording amplifier 124. Then, the recording amplifier 124 amplifies the recording signal inputted from the recording encoder 123, and then outputs the recording signal obtained after the amplification to the recording magnetic head 125 so as to record the recording signal on the magnetic tape 126 according to a helical scanning system.

Next, a reproducing process for the reproduced signal which is the recording signal of the multiplexed data recorded on the magnetic tape 126 will be described.

The reproduced signal reproduced from the reproducing magnetic head 127 is inputted to the reproduction processing unit 129 via the reproducing amplifier 128. The reproduction processing unit 129 detects whether the data is 0 or 1 in the reproduced signal. Further, the demodulation process is performed on the modulation signal modulated, and the multiplexed data obtained after the demodulation process is outputted to the error correcting decoder 130. The error correcting decoder 130 corrects correctable errors of the above-mentioned inputted multiplexed data based on the inner parity and the outer parity. The compressed video data, audio data and sub-code data which have undergone the error correcting decoding process are written into the memory 131. The rearrangement process reverse to the rearrangement executed in the recording stage is performed on the compressed video data under the control of the memory controller 132, and the processed video data, audio data and sub-code data are outputted as the multiplexed data 134 of the tape processing system to the a-side of the switch 141 and the data separator 135.

The data separator 135 separates or demultiplexes only the sub-code data from the multiplexed data 134 of the tape processing system, and then outputs the sub-code data to the system controller 115. That is, the sub-code data included in the multiplexed data 134 of the tape processing system is consistently inputted to the system controller 115.

Further, the apparatus of the EE processing system is constructed as follows. The multiplexed data 118 outputted from the data multiplexer 117 on the recording side is inputted to the frame memory 137a via the DV bus. The frame memories 137a and 137b are connected in series with each other, and are provided for adjusting the frame timings to match the frame timing of the multiplexed data 118 of the EE processing system with the frame timing of the multiplexed data 134 of the tape processing system. The memory controller 138 generates the write reset pulse WR for controlling the write operation of the frame memory 137a and the read reset pulse RR for controlling the read operation of the frame memory 137a in response to the frame pulse FP that is the frame reference signal generated in synchronization with the video signals inputted via the input terminals 100, 101 and 102 in the digital VTR, then outputs the generated pulses WR and RR to the frame memory 137a so as to control the operation of the frame memory 137a, generates the write reset pulse WR for controlling the write operation of the frame memory 137b and the read reset pulse RR for controlling the read operation of the frame memory 137b, and outputs the pulses WR and RR to the frame memory 137b so as to control the operation of the frame memory 137b.

In this case, each of the frame memories 137a and 137b delays, by one frame, the multiplexed data 118 outputted from the data multiplexer 117 via the DV bus, and then the frame memories 137a and 137b consequently output the multiplexed data 140 of the EE processing system which has been delayed by a total of two frames to the b-side of the switch 141. That is, as described above, the delay of a total of two frames is caused through the error correcting encoding process of the recording system, the recording encoding process of the recording system, the reproduced data processing of the reproduction system and the error correcting decoding process of the reproduction system. Therefore, the multiplexed data 118 outputted via the DV bus of the EE processing system is delayed by about two frames by the frame memories 137a and 137b, and thereafter, the delayed multiplexed data 188 is outputted as the multiplexed data 140 of the EE processing system to the b-side of the switch 141.

The switch 141 selects either one of the multiplexed data 134 of the tape processing system and the multiplexed data 140 of the EE processing system, under the control of the control signal 142 outputted from the system controller 115, and then outputs the selected data to the data separator 143. Then, the data separator 143 time-division-demultiplexes the compressed video data and the audio data from the selected multiplexed data, and then outputs these data to the high efficiency decoder 144 and the audio reproducing processing unit 154, respectively.

The high efficiency decoder 144 performs the decompression process reverse to the compression process of the high efficiency encoder 109 on the inputted compressed video data and writes the processed video data into the memory 145 in a unit of DCT block under the control of the memory controller 147 while the video data written in the memory 145 is read out in a unit of field. In this stage, a rearrangement process reverse to that in the recording stage is executed in a unit of macro block upon writing the video data. The luminance signal and the two color difference signals (B–Y) and (R–Y) outputted from the memory 145 are subjected to digital-to-analog conversion by the D/A converters 148, 149 and 150 to be converted into analog video signals and then outputted from the output terminals 151, 152 and 153, respectively. Further, the audio reproducing processing unit 154 performs the interleave process reverse to that in the recording stage individually for the two channels on the audio data separated or demultiplexed by the data separator 143, and the processed audio data of the two channels are subjected to digital-to-analog conversion by the D/A converters 155 and 156 to be converted into analog audio signals and outputted from the output terminals 157 and 158, respectively.

The above has described the flow of the processing operation of the digital VTR of the present preferred embodiment. A process for switching between the multiplexed data 134 of the tape processing system and the multiplexed data 140 of the EE processing system will be described in detail below.

The digital VTR has a various kinds of modes such as recording, reproduction, editing and the like. First of all, in the recording stage, it is required to monitor the video data and the audio data that are being recorded on the magnetic tape 126 by the monitor television set 161 and the monitor loudspeaker 162, respectively. Therefore, by switching the switch 141 to the b-side, the data 140 of the EE processing system is selected. Further, in the reproducing stage, it is required to output the video signal and the audio signal of the data reproduced from the magnetic tape 126 to the monitor television set 161 and the monitor loudspeaker 162, respectively. Therefore, by switching the switch 141 to the a-side, the data 134 of the tape processing system is selected.

FIG. 5 shows a timing chart showing an operation for switching between the multiplexed data 140 of the EE processing system and the multiplexed data 134 of the tape processing system at the switch 141 in an insertion editing stage in the digital VTR of the present preferred embodiment.

In FIG. 5, R1, R2, . . . denote the frames of data of the video signal inputted via the input terminals 100, 101 and 102, while P1, P2, . . . denote the frames of data that have been previously recorded on the magnetic tape 126. In this case, the frame P6 is the insertion editing starting point, and the data of the frame R6 and the subsequent frames are inserted behind the frame P5. In this case, the multiplexed data 118 of the EE processing system is delayed by a total of two frames by the frame memories 137a and 137b, and thereafter the delayed multiplexed data 140 is outputted from the frame memory 137b.

Therefore, by switching the switch 141 from the a-side to the b-side at the editing starting point EP, data switching is executed from the multiplexed data 134 of the tape processing system to the multiplexed data 140 of the EE processing system delayed by a total of two frames by the frame memories 137a and 137b at the start timing of the frame R6 at the editing starting point EP. By this operation, for the interval for which the data up to the frame P5 are reproduced, the video signal and the audio signal of the multiplexed data 134 of the tape processing system are outputted through the monitor television set 161 and the loudspeaker 162, respectively. Subsequently, for the interval for which the data of the frame R6 and the subsequent frames thereto are recorded so as to be inserted thereto, the video signal and the audio signal of the multiplexed data 140 of the EE processing system are outputted through the monitor television set 161 and the loudspeaker 162, respectively. In this case, the actual editing point of the video signal of the data on the magnetic tape 126 and the editing point of the video signal that has been subjected to the switching by the switch 141 through the processes of the reproduction system and is displayed on the monitor television set 161 are made to completely coincide with each other in time.

In order to correctly execute the insertion editing operation shown in FIG. 5 in a unit of frame, it is required to correctly execute the switching of the switch 141 with a frame unit accuracy by the system controller 115. For the above purpose, the system controller 115 detects the editing starting point EP based on the time code data included in the sub-code data reproduced from the magnetic tape 126. The sub-code data and the processing therefor will be described in detail below.

FIG. 7 is a plan view showing a track format (525/60 system) of the magnetic tape 126 in a helical scanning system digital VTR of the present preferred embodiment. The track format conforms to the track format of the home-use digital VTR standard by the HD Digital VCR Conference.

As shown in FIG. 7, one frame is comprised of ten tracks TR1, TR2, . . . , TR10, and each of the tracks TR1 to TR10 includes an insertion information data area 200, an audio data area 201, a video data area 202 and a sub-code data area 203, and guard areas 211, 212, 213 and 214 are provided between the respective areas. As shown in FIG. 7, sub-code data for auxiliary data is recorded not on linear tracks parallel to the longitudinal direction of the magnetic tape 126, but is recorded on the same tracks TR1, TR2, . . . , TR10 as those of the video data and the audio data. Therefore, the sub-code data reproduced from the magnetic tape 126 undergoes the reproduced data processing and the error correcting process in a manner similar to that of the video data and the audio data, and then the reproduced sub-code data is separated or demultiplexed by the data separator 135 to be transferred to the system controller 115. The system controller 115 is not in particular required to receive the sub-code data for recording use since the system controller 115 sets the sub-code data by itself, and the system controller 115 consistently receives the sub-code data reproduced from the magnetic tape 126. Then, based on the time code data included in the sub-code data reproduced from the magnetic tape 126, the switch 141 can be controlled so as to be switched over to switch the multiplexed data at the editing starting point EP.

It is to be noted that the multiplexed data 134 of the tape processing system is normally selected and then is outputted during the reproduction of the data recorded on the magnetic tape 126 as described above. However, in a special case, when the digital VTR is remotely controlled from an external apparatus (not shown), the case sometimes occurs where an instruction for outputting not the multiplexed data 134 of the tape processing system, but the multiplexed data 140 of the EE processing system in the reproducing stage. In this case, the instruction data from the external apparatus is inputted to the system controller 115, and in response to this, the system controller 115 switches the switch 141 to the b-side so as to select the multiplexed data 140 of the EE processing system. In this stage, the video signal and the audio signal of the multiplexed data of the EE processing system are outputted to the monitor television set 161 and the monitor loudspeaker 162. However, since the reproduced sub-code data is consistently transferred to the system controller 115, the system controller 115 can recognize the time code information in the reproduced multiplexed data 134.

As described above, according to the present preferred embodiment, the data switching between the multiplexed data 140 of the EE processing system and the multiplexed data 134 of the tape processing system is executed in the state of the multiplexed data coded at a high efficiency. Therefore, the storage capacity of the storage device required for matching the corresponding frames of both of them can be remarkably reduced as compared with the prior art. For example, according to the above-mentioned home-use digital VTR standard, the 4:2:2 component signal is compressed to about 1/6.7 thereof by the high efficiency encoder 109, and therefore, the memory amount required for delaying one frame can be reduced to about 0.83 Mbits. Furthermore, even when the video signal of the multiplexed data 140 of the EE processing system is selected as the output video signal to the monitor television set 161, the reproduced sub-code data is processed and transmitted to the system controller 115. Therefore, the sub-code data information such as the time code or the like reproduced from the magnetic tape 126 can be perceived. Furthermore, the path of the EE processing system is constructed in the state of the data bus on which the compressed video data and the audio data are multiplexed. Therefore, it is not required to provide individual EE processing system paths for the video data and the audio data, so that the circuit construction can be very simple.

Second Preferred Embodiment

FIG. 2 is a block diagram showing a construction of a digital VTR provided with an editor according to a second preferred embodiment of the present invention. The digital VTR of the second preferred embodiment shown in FIG. 2 differs from the first preferred embodiment shown in FIG. 1 in that:

(a) neither the frame memories 137a and 137b nor the memory controller 138 are provided, and the multiplexed data 118 outputted from the data multiplexer 117 is directly inputted to the b-side of the switch 141.

With the above arrangement, the timing matching of the frame of the multiplexed data 134 of the tape processing system to the corresponding frame of the multiplexed data 140 of the EE processing system in the above-mentioned insertion editing stage cannot be executed as in the first preferred embodiment. However, the EE processing system path is constructed in the state of the data bus on which the compressed video data and audio data are multiplexed, and accordingly, there is no need for providing individual EE processing system paths for the video data and audio data, therefore allowing the circuit construction to be very simple. Furthermore, the delay time in the above-mentioned insertion editing stage of the prior art digital VTR corresponds to the four frames, however, the delay time of the present preferred embodiment corresponds to two frames. Therefore, the time difference between the multiplexed data 134 of the tape processing system and the multiplexed data 140 of the EE processing system in the above-mentioned insertion editing stage can be reduced.

Third Preferred Embodiment

FIG. 3 is a block diagram showing a construction of a digital VTR provided with an editor according to a third preferred embodiment of the present invention. The digital VTR of the third preferred embodiment shown in FIG. 3 differs from the first preferred embodiment shown in FIG. 1 in that:

(a) multiplexed data (or a digital data signal) in a predetermined transmission format in which video data compressed by a high efficiency coding method similar to that of the high efficiency encoder 109, audio data interleaved by a method similar to the processing method of the audio recording processing unit 114 and the sub-code data are time-division-multiplexed by a method similar to that of the data multiplexer 117 is inputted via an input terminal 300 which is a digital interface terminal;

(b) there is provided a digital interface which receives multiplexed data in a transmission format inputted via the input terminal 300, converts the received multiplexed data into multiplexed data 302 in a predetermined format of the signal processing system of the digital VTR, and then outputs the resulting data;

(c) there is provided a switch 303 which is controlled using a control signal 305 from a system controller 304 to selectively switch over between the multiplexed data 118 which is outputted from the data multiplexer 117 and inputted to the a-side and multiplexed data 302 which is outputted from the digital interface 301 and inputted to the b-side, and then outputs the selected one of the multiplexed data to the memory 119 and the frame memory 137a via the DV data bus; and (d) the system controller 304 executes switching control by outputting the control signal 305 to the switch 303 based on the switching instruction data for the switch 303 inputted by means of the keyboard 400 in addition to the operation control of the system controller 115.

In the digital VTR of the third preferred embodiment constructed as above, the multiplexed data (or the digital data signal) in the predetermined transmission format is inputted in the form of the above-mentioned DV bus from a further external apparatus to the digital VTR via the digital interface 301. Advantageous effects, when inputting data in the state of multiplexed data in the DV bus format, are as follows.

(I) Since the video data that has been already compressed is transmitted, a transmission data rate can be reduced.

(II) An increase of distortion due to the repetition of compression and decompression can be prevented.

(III) Since the compressed video data and the interleaved audio data are multiplexed, both the data of the video signal and the audio signal can be transmitted by means of one transmission cable.

The operation of the present preferred embodiment will be described in detail below.

The multiplexed data or the digital data signal inputted via the input terminal 300 is inputted to the digital interface 301. The digital interface 301 converts the inputted multiplexed data in the predetermined transmission format into the format of the signal processing system of the digital VTR of the present preferred embodiment, and then outputs the resulting data to the b-side of the switch 303. Therefore, the multiplexed data 302 in the DV bus format outputted from the digital interface 301 is multiplexed data in completely the same format as that of the multiplexed data 118 in the DV bus format.

The switch 303 is a switch for selecting either one of the multiplexed data 118 in the DV bus format that is obtained through the processing of the analog video signal and the analog audio signal, and the multiplexed data 302 that is inputted from the input terminal 300 or the digital interface terminal via the digital interface 301, as the multiplexed data to be recorded on the magnetic tape 126, and the switch 303 is controlled to be switched over using the control signal 305 generated by the system controller 304. The system controller 304 switches the switch 303 to the a-side or to the b-side in response to the switching instruction data for the switch 303 which is inputted using the keyboard 400 provided on a front panel of the digital VTR. When the switch 303 is switched over to the a-side, the multiplexed data 118 outputted from the data multiplexer 117 is selected and then is outputted to the memory 119 and the frame memory 137a. On the other hand, when the switch 303 is switched over to the b-side, the multiplexed data 302 outputted from the digital interface 301 is selected and then is outputted to the memory 119 and the frame memory 137a. It is to be noted that the processing of the multiplexed data selected by the switch 303 is similar to that of the first preferred embodiment.

FIG. 6 is a timing chart showing the detail of the operation of switching between the multiplexed data 140 of the EE processing system and the multiplexed data 134 of the tape processing system at the switch 141 in the insertion editing stage of the digital VTR of the present preferred embodiment. In this case, the switch 303 is switched over to the b-side.

In FIG. 6, DR1, DR2, . . . denote the frames of the multiplexed data inputted via the input terminal 300, while P1, P2, . . . denote the frames of the data that have been previously recorded on the magnetic tape 126. In this case, the frame P6 is the insertion editing starting point, and the data of the frame DR6 and the subsequent frames thereto are inserted behind the data of the frame P5. In this case, the multiplexed data 302 of the EE processing system is delayed by a total of two frames by the frame memories 137a and 137b, and thereafter, the delayed multiplexed data 140 is inserted.

Therefore, by switching over the switch 141 from the a-side to the b-side at the editing starting point EP, the data switching from the multiplexed data 134 of the tape processing system to the multiplexed data 140 of the EE processing system that has been delayed by a total of two frames by the frame memories 137a and 137b is executed at the start timing of the frame DR6 at the editing starting point EP. By this operation, for the interval for which the data up to the frame P5 are reproduced, the video signal and the audio signal of the multiplexed data 134 of the tape processing system are outputted through the monitor television set 161 and the loudspeaker 162, respectively. Subsequently, for the interval for which the data of the frame DR6 and the subsequent frames are recorded so as to be inserted, the video signal and the audio signal of the multiplexed data 140 of the EE processing system are outputted through the monitor television set 161 and the loudspeaker 162, respectively. In this case, the actual editing point of the video signal of the data on the magnetic tape 126 and the editing point of the video signal that has been subjected to the switching by the switch 141 through the processes of the reproduction system and is displayed on the monitor television set 161 are made to completely coincide with each other in time.

As described above, according to the present preferred embodiment, in addition to the effect of the first preferred embodiment, the multiplexed data 302 including the compressed video data and the audio data from the input terminal 300, which is the digital interface terminal, via the digital interface 301 can be used as the multiplexed data of the EE processing system by switching the switch 303 to the b-side.

Fourth Preferred Embodiment

FIG. 4 is a block diagram showing a construction of a digital VTR provided with an editor according to a fourth preferred embodiment of the present invention. The digital VTR of the fourth preferred embodiment shown in FIG. 4 differs from the third preferred embodiment shown in FIG. 3 in that:

(a) neither the frame memories 137a and 137b nor the memory controller 138 are provided, and the multiplexed data outputted from the switch 303 is directly inputted to the b-side of the switch 141.

With the above arrangement, the timing matching of the frame of the multiplexed data 134 of the tape processing system to the corresponding frame of the multiplexed data of the EE processing system in the above-mentioned insertion editing stage cannot be executed as that in the third preferred embodiment. However, the EE processing system path is constructed in the state of the data bus on which the compressed video data and the audio data are multiplexed. Therefore, it is not required to provide individual EE processing system paths for the video data and the audio data, so that the circuit construction can be very simple. Furthermore, the delay time in the above-mentioned insertion editing stage of the prior art digital VTR corresponds to four frames, however, the delay time of the present preferred embodiment corresponds to two frames. Therefore, the time difference between the multiplexed data 134 of the tape processing system and the multiplexed data 140 of the EE processing system in the above-mentioned insertion editing stage can be reduced.

Modified Preferred Embodiment

In the above-mentioned preferred embodiments, the digital VTR for recording and reproducing the multiplexed data including the video data and the audio data on the magnetic tape 126 is described. However, the present invention is not limited to this, and the present invention can be applied to a recording and reproducing device for recording and reproducing the above-mentioned multiplexed data on a recording medium such as an optical disk, a magneto-optical disk, a semiconductor memory, or the like.

In the above-mentioned preferred embodiments, the video signal and the audio signal are recorded, reproduced and edited. However, the present invention is not limited to this, and the present invention may be constructed so as to process only the video signal.

In the above-mentioned preferred embodiments, the intra-frame compression method by means of DCT is used as the high efficiency coding method. However, the present invention is not limited to this, and, for example, a high efficiency coding method by means of a plurality of frames such as MPEG (Motion Picture Experts Group) or the like may be used.

INDUSTRIAL APPLICABILITY

As described above, according to the first aspect of the present invention, there is provided a digital signal recording and reproducing device comprising:

high efficiency encoding means (109) for encoding a digital video signal at a high efficiency and outputting video data encoded at the high efficiency;

recording means (123, 124, 125) for executing a predetermined encoding process for recording on the video data that is encoded at the high efficiency and outputted from the high efficiency encoding means (109) and for recording video data obtained after the encoding process on a recording medium (126);

reproducing means (127, 128, 129) for reproducing the video data recorded on the recording medium (126), executing a predetermined reproduced data processing for reproduction on reproduced video data and for outputting video data obtained after the reproduced data processing;

delay means (137a, 137b) for delaying the video data outputted from the high efficiency encoding means (109) by a delay time of a total of a delay time of the video data relevant to the processing of the recording means (123, 124, 125) and a delay time of the video data relevant to the processing of the reproducing means (127, 128, 129), and for outputting delayed video data;

selecting means (141) for selectively switching over between video data outputted from the delay means (137a, 137b) and video data outputted from the reproducing means (127, 128, 129), and for outputting selected one of the video data; and high efficiency decoding means (144) for high-efficiency-decoding the video data outputted from the selecting means (141), and for outputting video data high-efficiency-decoded.

Therefore, as compared with the prior art, the memory capacity of the storage device required for delaying the video data of the EE processing system for the purpose of the above-mentioned timing matching can be remarkably reduced.

Furthermore, according to the second aspect of the present invention, there is provided a digital signal recording and reproducing device comprising:

high efficiency encoding means (109) for encoding a digital video signal at a high efficiency, and for outputting video data encoded at the high efficiency;

recording means (123, 124, 125) for executing a predetermined encoding process for recording on the video data that is encoded at the high efficiency and outputted from the high efficiency encoding means (109) and for recording video data obtained after the encoding process on a recording medium (126);

reproducing means (127, 128, 129) for reproducing the video data recorded on the recording medium (126), executing a predetermined reproduced data processing for reproduction on reproduced video data, and for outputting video data obtained after the reproduced data processing;

selecting means (141) for selectively switching over between video data outputted from the high efficiency encoding means (109) and video data outputted from the reproducing means (127, 128, 129), and for outputting selected one of the video data; and high efficiency decoding means (144) for high-efficiency-decoding the video data outputted from the selecting means (141) and for outputting video data high-efficiency-decoded.

Therefore, as compared with the prior art, the time difference between the video data of the tape processing system and the video data of the EE processing system in the above-mentioned insertion editing stage can be reduced.

We claim:

1. A digital signal recording and reproducing device comprising:

high efficiency encoding means for encoding a digital video signal at a high efficiency and outputting video data encoded at the high efficiency;

recording means for executing a predetermined encoding process for recording the video data encoded at high efficiency and outputted from said high efficiency encoding means and for recording video data obtained after the encoding process on a recording medium;

reproducing means for reproducing the video data recorded on said recording medium executing a predetermined data processing on the reproduced video data and outputting the video data;

delay means for delaying the video data outputted from said high efficiency encoding means by a delay time of a total of a delay time of the video data relevant to the processing of said recording means and a delay time of the video data relevant to the processing of said reproducing means, and for outputting delayed video data;

selecting means for selectively switching over between video data outputted from said delay means and video data outputted from said reproducing means, and for outputting the selected one of the video data; and high efficiency decoding means for high-efficiency-decoding the video data outputted from said selecting means, and for outputting video data high-efficiency-decoded.

2. A digital signal recording and reproducing device as claimed in claim 1, further comprising:

multiplexing means for time-division-multiplexing the video data outputted from said high efficiency encoding means and audio data, and for outputting resulting multiplexed data;

wherein said recording means executes the predetermined encoding process for recording on the multiplexed data outputted from said multiplexing means and records the multiplexed data obtained after the encoding process on the recording medium;

said reproducing means reproduces the multiplexed data recorded on said recording medium, executes the predetermined reproduced data processing for reproduction on the reproduced multiplexed data, and outputs the multiplexed data obtained after the reproduced data processing;

said delay means delays the multiplexed data outputted from said multiplexing means by a delay time of a total of a delay time of the multiplexed data relevant to the processing of said recording means and a delay time of the multiplexed data relevant to the processing of said reproducing means, and outputs delayed multiplexed data; and said selecting means selectively switches over between the multiplexed data outputted from said delay means and the multiplexed data outputted from said reproducing means, and outputs selected one of the multiplexed data;

wherein said device further comprises:

data separating means for time-division-demultiplexing the multiplexed data outputted from said selecting means into video data and audio data, and for outputting the demultiplexed video data and audio data.

3. A digital signal recording and reproducing device as claimed in claim 2, wherein said delay means comprises two frame memories which are connected in series and each of which delays inputted video data by one frame.

4. A digital signal recording and reproducing device as claimed in claim 2, further comprising:

a digital interface for receiving multiplexed data into which video data encoded at a high efficiency and audio data are time-division-multiplexed, and for outputting received multiplexed data; and further selecting means for selectively switching over between the multiplexed data outputted from said digital interface and the multiplexed data outputted from said multiplexing means, and for outputting selected one of the multiplexed data to said recording means and said delay means.

5. A digital signal recording and reproducing device as claimed in claim 4, wherein said delay means comprises two frame memories which are connected in series and each of which delays inputted video data by one frame.

6. A digital signal recording and reproducing device as claimed in claim 1, further comprising:

a digital interface for receiving video data encoded at a high efficiency and for outputting the received video data; and further selecting means for selectively switching over between video data that is encoded at the high efficiency and outputted from said digital interface and video data that is encoded at the high efficiency and outputted from said high efficiency encoding means, and for outputting selected one video data of the two video data to said recording means and said delay means.

7. A digital signal recording and reproducing device as claimed in claim 6, wherein said delay means comprises two frame memories which are connected in series and each of which delays inputted video data by one frame.

8. A digital signal recording and reproducing device as claimed in claim 1, wherein said delay means comprises two frame memories which are connected in series and each of which delays inputted video data by one frame.

9. A digital signal recording and reproducing device comprising:

high efficiency encoding means for encoding a digital video signal at a high efficiency, and for outputting video data encoded at the high efficiency;

recording means for executing a predetermined encoding process for recording the video data encoded at high efficiency and outputted from said high efficiency encoding means and for recording video data obtained after the encoding process on a recording medium;

reproducing means for reproducing the video data recorded on said recording medium, executing a predetermined data processing on the reproduced video data and outputting the video data;

selecting means for selectively switching over between video data outputted from said high efficiency encoding means and video data outputted from said reproducing means, and for outputting the selected one of the video data;

high efficiency decoding means for high-efficiency-decoding the video data outputted from said selecting means and for outputting video data high-efficiency-decoded; and multiplexing means for time-division-multiplexing the video data outputted from said high efficiency encoding means and audio data, and for outputting resulting multiplexed data;

wherein said recording means executes the predetermined encoding process for recording on the multiplexed data outputted from said multiplexing means, and records the multiplexed data obtained after the encoding process on the recording medium;

said reproducing means reproduces the multiplexed data recorded on said recording medium, executes the predetermined data processing, and outputs the multiplexed data after the data processing; and said selecting means selectively switches over between the multiplexed data outputted from said data multiplexing means and the multiplexed data outputted from said reproducing means, and outputs the selected one of the multiplexed data; and wherein said device further comprises:

data separating means for time-division-demultiplexing the multiplexed data outputted from said selecting means into video data and audio data, and for outputting demultiplexed video data and audio data.

10. A digital signal recording and reproducing device as claimed in claim 9, further comprising:

a digital interface for receiving multiplexed data in which video data encoded at a high efficiency and audio data are time-division-multiplexed, and for outputting received multiplexed data; and further selecting means for selectively switching over between the multiplexed data outputted from said digital interface and the multiplexed data outputted from said multiplexing means, and for outputting selected one of the multiplexed data to said recording means and said selecting means.

11. A digital signal recording and reproducing device as claimed in claim 9, further comprising:

a digital interface for receiving video data encoded at a high efficiency, and for outputting received video data; and further selecting means for selectively switching over between video data that is encoded at the high efficiency and outputted from said digital interface and video data that is encoded at the high efficiency and outputted from said high efficiency encoding means, and for outputting selected one video data of the two video data to said recording means and said selecting means.

* * * * *